United States Patent Office 2,722,536
Patented Nov. 1, 1955

2,722,536

4-[X-ACYLAMINOANILINO]-1,X-DIHYDROXY-5 (OR 8) NITROANTHRAQUINONES

Milton L. Hoefle, David I. Randall, and Edgar E. Renfrew, Easton, Pa., assignors to General Aniline & Film Corporation, New York, N. Y., a corporation of Delaware No Drawing. Application January 23, 1953,
Serial No. 333,004

6 Claims. (Cl. 260—377)

This invention relates to 4-[x-acylaminoanilino]-1,x-dihydroxy-5 (or 8) nitroanthraquinones possessing excellent gas and light fastness when dyed on cellulose ester fibers.

1,5 - dihydroxy - 4 - arylaminoanthraquinone dyes have been prepared by heating a mixture of leuco-1,4,5-trihydroxy anthraquinone and an arylamine, such as p-aminoacetanilide. While such dyes are useful for dyeing cellulose acetate and other plastic materials, they are not entirely suitable acetate dyes because of their low affinity and poor light and gas fastness.

Arylaminoanthraquinone dyes prepared by condensing either 4,5-dinitrochrysazine or 4,8-dinitroanthrarufin with p-amino acetanilide are not satisfactory for cellulose esters since the substantivity is not great enough to produce shades of satisfactory depth.

We have discovered that by condensing specific amino-N-alkyl- and N-cyanoalkyl-arylacidylamides with 4,5-dinitrochrysazine or 4,8-dinitroanthrarufin, dyestuffs are obtained which possess three to four times as much affinity, i. e., substantivity, for cellulose acetate than any one of the aforementioned dyes, especially those obtained by the condensation of a dinitro-dihydroxyanthraquinone with p-aminoacetanilide. Furthermore, when dyed on a weight for weight basis, the dyes of the present invention outlast the aforementioned dyestuffs in light tests and impart dyeings of constant blue shades of superior gas fastness.

The dyestuffs obtained by the foregoing procedure are characterized by the following general formula:

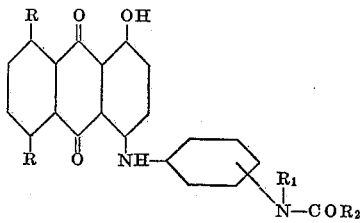

wherein the R's are unlike and represent hydroxy or nitro groups, $R_1$ represents a lower alkyl group, e. g., methyl, ethyl, propyl, and butyl, lower cyanoalkyl, e. g., cyanoethyl, cyanopropyl, etc., and $R_2$ represents either hydrogen or a lower alkyl group of the same value as $R_1$.

The amino-N-alkyl-arylacidylamides and the amino-N-cyanoalkyl-arylacidylamides employed in the aforementioned condensation are characterized by the following formula:

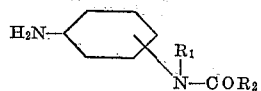

wherein $R_1$ and $R_2$ have the same values as above. As illustrative examples of such compounds, the following may be mentioned:

m- and p-amino-N-methylacetanilide.
m- and p-amino-N-ethylacetanilide.
m- and p-amino-N-propylacetanilide.
m- and p-amino-N-butylacetanilide.
m- and p-amino-N-methylformanilide.
m- and p-amino-N-propylformanilide.
m- and p-amino-N-ethylformanilide.
m- and p-amino-N-butylformanilide.
m- and p-amino-N-(2-cyanoethyl)acetanilide.

The enhanced substantivity to cellulosic fabrics and excellent light and gas fastness of the dyestuffs of the present invention are apparently due to the presence of either an alkyl or a cyanoalkyl grouping on the nitrogen atom which bears the acidyl radical. As pointed out above, these groupings have exceptionally good affinity to cellulosic fabrics while the configuration in which the nitrogen atom carries only hydrogen shows dyeings of ¼ to ⅓ the strength. This result is unexpected and surprising in view of the several cases which can be cited wherein the two structures are virtually similar and can be considered equivalent. For instance, the condensation between p-aminoacetanilide and 1-amino-4-bromo-anthraquinone-2-sulfonic acid ("bromamine acid") and that between p - amino - N - methylacetanilide and bromamine acid yield dyestuffs for wool which are of slightly different shades but virtually equal in substantivity and other important properties. Furthermore, bromination by similar procedures of the above mentioned wool dyestuffs yield products of similar properties.

In view of the teachings of the prior art that the structures are equivalent, it is unpredictable that there is such remarkable dissimilarity in substantivity for cellulose acetate between the condensation products of the p-aminoacetanilide and p-amino-N-methylacetanilide with dihydroxy-dinitroanthraquinones which are disclosed herein. Quite probably the destruction of a degree of the symmetry of the molecule is the fundamental reason why the new structure is so much superior. Whatever the reason, it is noteworthy that the compounds disclosed herein are considerably advanced in merit from the related products disclosed in the prior art and, accordingly, constitute a valuable advance in the dyestuff art.

The dyestuffs characterized by the foregoing formula are prepared by condensing one mole of 4,8-dinitro-anthrarufin or 4,5-dinitrochrysazine with one mole of either m- or p-amino-N-alkyl-arylacidylamide or m- or p-amino-N-cyanoalkyl derivatives thereof in the presence of a sufficient quantity of a suitable inert solvent, such as nitrobenzene, a mixture of pyridine and picolines boiling between 110° and 120° C. ("green oil"), o-dichlorobenzene, and the like at a temperature of 110° to 210° C. for 1 to 9 hours with stirring. The final product is isolated by filtration alone, or by drowning followed by filtration, or by steam distillation followed by filtration, depending upon which solvent is used. The color of the dyes is blue and when applied to various fabrics and yarns, the original hue remains unchanged after prolonged exposure to light and gas fumes.

The following examples will describe the preparation of some of the dyestuffs characterized by the foregoing general formula. It is to be understood that they are merely illustrative and that the invention claimed herein is not to be regarded as restrictive thereof. All the parts given are by weight unless otherwise stated.

*Example 1*

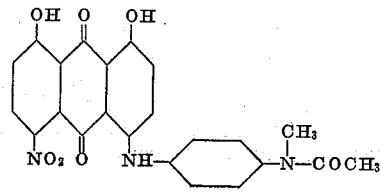

In a vessel equipped with a stirrer, a heater, and a reflux condenser were placed 192 parts of 4,5-dinitrochrysazine, 214 parts of p-amino-N-methylacetanilide, and 2400 parts of nitrobenzene. Heat was applied to the stirred mixture. The temperature was raised rapidly to the point where the solvent boiled vigorously and held there 1⅓ hours. The mixture was allowed to cool, water was added, and steam distillation was carried out until the solvent had been carried away. The residue was isolated by decantation and placed with 2500 parts of water containing 200 parts of sodium bicarbonate and 200 parts of sodium carbonate. The mixture was heated to 95° C. for ½ hour while stirring and filtered hot. The residue was washed well with water and stirred with 1000 parts of water containing 50 parts of concentrated hydrochloric acid at 95° C. for ½ hour. The product was isolated by filtration, washed well, and dried. It weighed 240 parts. When dispersed by the usual methods (such as dissolution in a small amount of alcohol, acetone, or other water-soluble solvent followed by pouring into soapy water; or milling with a suitable dispersing agent), the product yields by the usual dyeing methods attractive heavy blue dyeings on cellulose acetate which show exceptionally good resistance to the action of acid gas fumes and to the action of light. Other properties are also very good, for instance, the wash fastness and the non-staining of cotton and wool fabrics.

*Example 2*

In a suitable vessel were placed 192 parts of 4,5-dinitrochrysazine, 214 parts of p-amino-N-methylacetanilide, and 2000 parts of a mixture of pyridine and picolines boiling between 110° and 120° C. (green oil). The mixture was stirred at such temperature that the solvent boiled briskly. At the end of 12 hours, the mixture was poured into water and the product which settled was isolated by decantation through a filter. The product was purified by slurrying with warm dilute hydrochloric acid followed by filtration. The cake was then slurried with an aqueous carbonate-bicarbonate buffer solution which was then filtered and washed neutral. The dried product having the same formula as in Example 1 produced dyeings which were identical in all respects with the product of Example 1.

*Example 3*

In a suitable vessel were placed 192 parts of 4,5-dinitrochrysazine, 214 parts of p-amino-N-methylacetanilide and 2000 parts of "Tar Bases 50-A" (Barrett Division, Allied Chemical and Dye Corp.), a fraction of tertiary heterocyclic bases related to pyridine, which boils between 170° to 180° C. The reaction is maintained while stirring at such a temperature that the solvent boils vigorously for 3 hours, after which time it is allowed to cool. The product is isolated and purified by the method described in Example 1. The product having the same formula as in Example 1 yields dyeings identical with those of Example 1.

*Example 4*

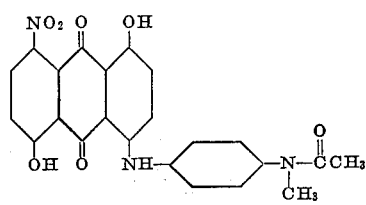

Into a reaction vessel equipped with stirrer, thermometer, and condenser were charged 6.6 parts of 4,8-dinitroanthrarufin, 6.6 parts of p-amino-N-methylacetanilide, and 45 parts of o-dichlorobenzene. This reaction mixture was heated at 150° C. for 7 hours. The reaction mixture was then allowed to cool slowly to room temperature. The product which precipitated out was then removed by filtration, and washed with 25 parts of o-dichlorobenzene. The product was further purified by suspending in 50 parts of benzene and warming to 75° C. for 15 minutes. This mixture was then cooled and the product removed by filtration. After drying in an oven at 60° C., the yield of product was 8.6 parts. This product dyed rayon acetate in blue shades of excellent gas and light fastness.

*Example 5*

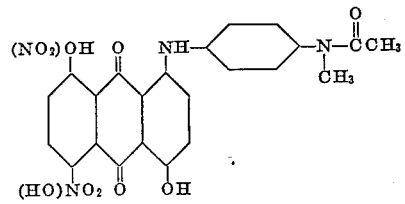

Into a reaction vessel equipped with a thermometer, stirrer, and condenser were charged 18 parts of a mixture of 4,8-dinitroanthrarufin and 4,5-dinitrochrysazine, 18 parts of p-amino-N-methylacetanilide, and 120 parts of nitrobenzene. The reaction mixture was heated at 175–185° C. for 5 hours and the course of the reaction was followed by chromatographing a small portion of the reaction mixture every half hour. After 4 hours almost all of the starting material had disappeared. The excess solvent was removed by steam distillation and the product was then suspended in 1000 parts of water containing 5 parts of sodium carbonate and 5 parts of sodium bicarbonate. This mixture was heated to 95° C. and stirred for ½ hour. The mixture was cooled to 50° C. and filtered. The product was further purified by suspending in 1000 parts of methanol and warming to the boiling temperature for 10 minutes. This mixture was allowed to cool and the product removed by filtration. The product weighed 21.5 parts after drying in an oven.

*Example 6*

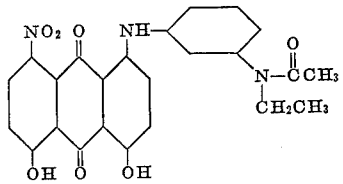

Into a reaction vessel equipped with stirrer, thermometer, and condenser were charged 6.6 parts of 4,5-dinitrochrysazine, 6.8 parts of m-amino-N-ethylacetanilide, and 40 parts of nitrobenzene. The reaction mixture was heated at 180–190° C. for 4 hours. The reaction mixture was then steam distilled, and the product was isolated by filtration. This product was purified by suspending in 750 parts of water containing 4 parts of sodium bicarbonate and 4 parts of sodium carbonate and heating at reflux for 30 minutes. The product was isolated by filtration and then suspended in 750 parts of water containing 5 parts of concentrated hydrochloric acid and heated for an additional 30 minutes. The product was removed by filtration and washed with warm water. After drying, 8.4 parts of product were obtained. This product dyed rayon acetate in blue shades which possessed excellent gas and light fastness.

*Example 7*

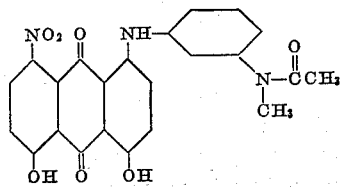

Into a reaction vessel equipped with stirrer, thermometer, and condenser were charged 6.6 parts of 4,5-dinitrochrysazine, 6.6 parts of m-amino-N-methylacetanilide, and 40 parts of nitrobenzene. The reaction mixture was heated at 180–190° C. for 4 hours. The mixture was steam distilled and the product was isolated by filtration. The product was purified by suspending in 750 parts of water containing 4 parts of sodium carbonate and 4 parts of sodium bicarbonate and heating this suspension at 90–95° C. for 30 minutes with stirring. This mixture was filtered while hot, and the product was then ground up fine and suspended in 150 parts of methanol which was then refluxed gently for 15 minutes. This mixture was then cooled and filtered. Upon drying, 5.3 parts of product were obtained which dyed acetate rayon in blue shades and which were exceptionally gas and light fast.

*Example 8*

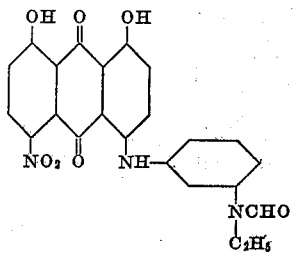

Into a reaction vessel equipped with a stirrer thermometer, and condenser were charged 6.6 parts of 4,5-dinitrochrysazine, 6.6 parts of m-amino-N-ethylformanilide and 45 parts of o-dichlorobenzene. The reaction mixture was heated at 160–165° C. for 10 hours. The reaction mixture was then steam distilled, and the resulting product isolated by filtration. The product was suspended in 150 parts of methanol and warmed gently on a steam cone. Upon filtering hot, the product was suspended in 1000 parts of water at 95° C. containing 4 parts of sodium carbonate and 4 parts of sodium bicarbonate and stirred for 30 minutes. This mixture was filtered hot and the product was washed with hot water. The product was dried at 60° C. in an oven and weighed 4.2 parts. This product dyed acetate rayon in blue shades of excellent gas and light fastness.

*Example 9*

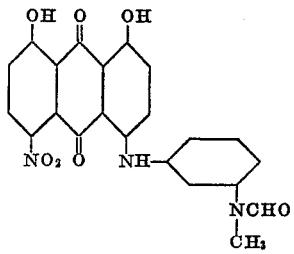

Into a reaction vessel equipped with stirrer, thermometer, and condenser were charged 6.6 parts of 4,5-dinitrochrysazine, 6.4 parts of m-amino-N-methylformanilide and 45 parts of o-dichlorobenzene. The reaction mixture was heated at 160° C. for 10 hours. It was then steam distilled and the product was isolated by filtration. The product was purified by suspending it in 150 parts of methanol and refluxing gently. After filtering this mixture, the product was suspended in 1000 parts of water containing 4 parts of sodium carbonate and 4 parts of sodium bicarbonate. This mixture was stirred for 30 minutes at 95° C. It was then filtered hot and the product was washed with hot water. 6.7 Parts of product were obtained. This material dyed acetate rayon in blue shades of excellent gas and light fastness.

*Example 10*

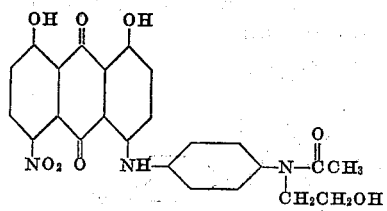

Into a reaction flask equipped with a stirrer, thermometer, and condenser were charged 6.6 parts of 4,5-dinitrochrysazine, 8 parts of p-amino-N-($\beta$-hydroxyethyl)-acetanilide, and 40 parts of o-dichlorobenzene. The reaction mixture was refluxed for 6 hours, and it was then steam distilled. The product was then suspended in 750 parts of water containing 4 parts of sodium carbonate and 4 parts of sodium bicarbonate, and this mixture was stirred at 90–95° C. for 30 minutes. This mixture was filtered hot. The product after drying dyed rayon acetate in deep blue shades possessing excellent gas and light fastness.

*Example 11*

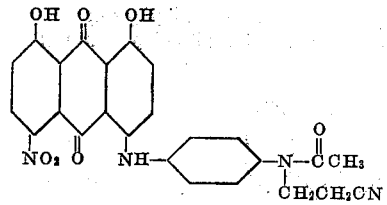

Into a reaction flask equipped with a thermometer, stirrer, and reflux condenser were charged 6.6 parts of 4,5-dinitrochrysazine, 8.1 parts of p-amino-N-(2-cyanoethyl) acetanilide, prepared by cyanoethylation of p-aminoacetanilide and 40 parts of nitrobenzene. The reaction mixture was stirred at reflux for 6 hours, and it was then steam distilled. The product was then suspended in 750 parts of water containing 4 parts of sodium carbonate and sodium bicarbonate, and this mixture was stirred at 90–95° C. for 30 minutes. The mixture was filtered hot and 11.3 parts of product were obtained which dyed acetate rayon in deep blue shades possessing excellent gas and light fastness.

*Example 12*

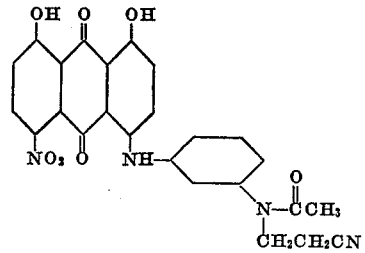

Into a reaction flask equipped with a thermometer, stirrer, and reflux condenser were charged 6.6 parts of 4,5 dinitrochrysazine, 8.1 parts of m-amino-N-(2-cyanoethyl)-acetanilide, prepared by cyanoethylation of m-aminoacetanilide and 40 parts of nitrobenzene. The reaction mixture was stirred at reflux for 6 hours, and it was then worked up as described in the preceding example. The product dyed acetate rayon in blue shades possessing outstanding light and gas fastness.

As many apparently widely different embodiments of this invention may be made without departing from the spirit and scope thereof, it is to be understood that we do not wish to limit ourselves to the specific embodiments thereof except as defined by the appended claims.

We claim:

1. Dyestuffs characterized by the formula selected from the class consisting of the following general formulae:

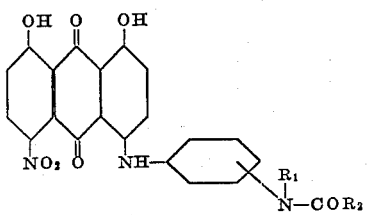

and

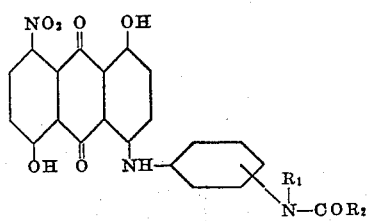

wherein $R_1$ represents a member selected from the class consisting of lower alkyl and lower cyanoalkyl groups, and $R_2$ represents a member selected from the class consisting of hydrogen, and lower alkyl groups.

2. A dyestuff having the following formula:

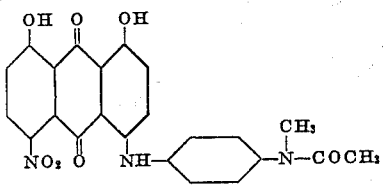

3. A dyestuff having the following formula:

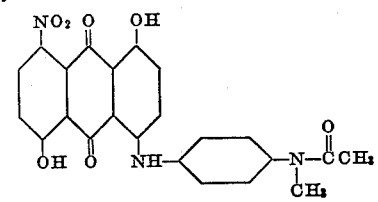

4. A dyestuff having the following formula:

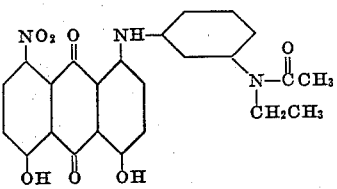

5. A dyestuff having the following formula:

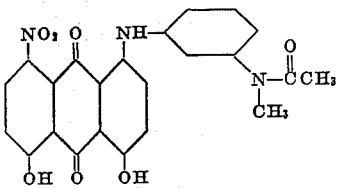

6. A dyestuff having the following formula:

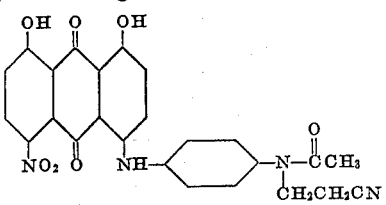

References Cited in the file of this patent

UNITED STATES PATENTS

| | | |
|---|---|---|
| 2,480,269 | Seymour et al. | Aug. 30, 1949 |
| 2,641,602 | Straley et al. | June 9, 1953 |
| 2,651,641 | Straley et al. | Sept. 8, 1953 |

FOREIGN PATENTS

| | | |
|---|---|---|
| 420,593 | Great Britain | Dec. 5, 1934 |